UNITED STATES PATENT OFFICE.

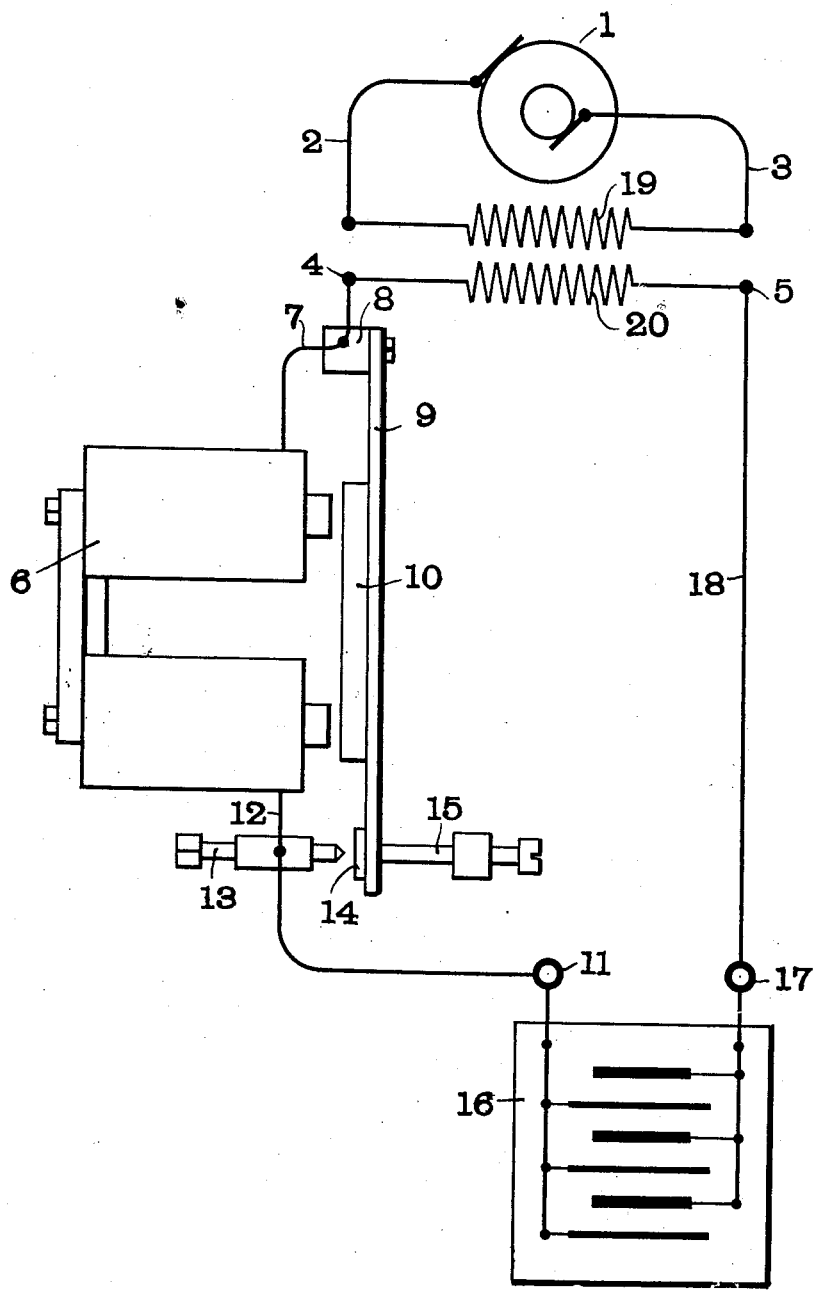

ERNST FÄSSLER, OF FRANKFORT-ON-THE-MAIN, GERMANY, ASSIGNOR TO WAGNER ELECTRIC MANUFACTURING COMPANY, OF ST. LOUIS, MISSOURI, A CORPORATION OF MISSOURI.

ALTERNATING-CURRENT RECTIFIER.

1,131,920.

Specification of Letters Patent. Patented Mar. 16, 1915.

Application filed November 5, 1910. Serial No. 590,853.

*To all whom it may concern:*

Be it known that I, ERNST FÄSSLER, a subject of the Emperor of Germany, residing at Frankfort-on-the-Main, in the Empire of Germany, have invented a certain new and useful Alternating-Current Rectifier, of which the following is such a full, clear, and exact description as will enable any one skilled in the art to which it appertains to make and use the same, reference being had to the accompanying drawings, forming part of this specification.

My invention relates to apparatus for obtaining from an alternating current source of supply a current in which the impulses in one direction are of greater magnitude than in the other direction thus giving a resultant effect, in some applications, equivalent to that produced by a uni-directional current.

The object of my invention is to produce a simple, commercially practical device of this chhracter and one which is particularly adapted for charging storage batteries.

The accompanying drawing is a diagrammatic representation of one form of rectifier made in accordance with my invention.

1 represents a suitable source of alternating current supply, such for instance as an alternating current generator, connected to the primary 19 of a transformer by way of the mains 2 and 3. The secondary 20 of said transformer feeds the rectifying circuit which contains a storage battery 16 and an electromagnet 6, the windings of which are adapted to be short-circuited by the movement of an armature 10.

The connections can be traced as follows: from the terminal 4 of the transformer to the support 8, through conductor 7, the windings of the electromagnet 6 and the conductor 12 to the adjustable contact 13, thence to the terminal 11 of the storage battery and from its terminal 17, through conductor 18 back to the terminal 5 of the secondary 20 of the transformer. A spring 9 is attached to the support 8, and carries the armature 10 of the electromagnet 6 and a contact 14 adapted to coöperate with the contact 13. The adjustable stop 15 serves to limit the travel of the spring 9 away from the magnet. Because the contact 14 is electrically connected to the support 8 it will short-circuit the windings of the electromagnet 6 as soon as it comes into touch with the contact 13.

It will be seen that by this connection the unidirectional E. M. F. of the battery 16 will always be opposed to the alternating E. M. F. during one-half cycle and will always be of the same direction as said alternating E. M. F. during the other half cycle. The maximum value of the alternating voltage impressed on the rectifying circuit is chosen in excess of the average terminal voltage of the battery by an amount which will suffice to drive a suitable charging current through the battery. The resultant E. M. F. acting in the circuit 4, 8, 6, 11, 16, 17, 5, 20 and therefore impressed on the electromagnet 6, when the contact 14 does not short-circuit said electromagnet, is the sum of the battery and of the line E. M. F. and is itself an alternating E. M. F. but with unequal maxima of opposite sign. The impedance of that part of the circuit which lies between the support 8 and the battery terminal 11, and which comprises the electromagnet 6 is made high, for instance by winding the magnet with many turns of fine wire, thus limiting the current through said magnet to the desired extent.

The spring 9 and the armature 10 attached to it are so adjusted that their period of vibration shall lag by about 180 degrees behind the alternating E. M. F. impressed on the rectifying circuit. In order to cause the phase of this vibration to acquire this lag it is necessary to limit the flux through 6 to unidirectional impulses, which is accomplished by periodically short-circuiting the electromagnet, and to suitably adjust the natural frequency of vibration of the spring mounted armature. In order to enable the latter to synchronously respond to said flux impulses it is necessary to make its natural frequency of vibration of the same order of magnitude as the frequency of the alternating E. M. F. impressed on the electromagnet 6. When a spring adjusted in the manner described is subjected to the influence of the electromagnet 6 it will vibrate in synchronism with the flux impulses through that magnet but will not necessarily vibrate in phase with said impulses.

The difference of phase between the vibrations of the spring mounted armature and the alternations of the flux impulses through the magnet controlling the frequency of said armature depends on the sign and magnitude of the difference between the natural frequency of the spring mounted armature and the frequency of alternation of the controlling flux impulses or of the controlling alternating E. M. F. If the natural frequency of vibration of the spring mounted armature is less than the frequency of the alternating E. M. F. then the armature will vibrate synchronously with said flux impulses but the phase of its vibration will lag behind the phase of the flux impulses, the lower natural frequency of the armature mechanically producing an effect on the phase of the armature vibration similar to that produced by an impedance on the phase of the current in an electrical circuit. If the natural frequency of vibration of the spring mounted armature is the same as that of the alternating E. M. F. resonance will occur, the armature vibrating in synchronism and in phase with the flux impulses. If the natural frequency of vibration of the spring mounted armature is higher than that of the alternating E. M. F. then it will vibrate synchronously with the flux impulses but the phase of its vibration will lead the phase of said impulses, the higher natural frequency of the armature, mechanically producing an effect on the phase of the armature vibration similar to that produced by a condenser on the phase of the current in an electric circuit. The spring 9 should in addition be of sufficient stiffness not to respond, when at rest, to the attraction of the magnet 6 at the time when the energizing current of the electromagnet is due to the difference between the alternating and the unidirectional E. M. F.'s. This spring, should however, respond even when at rest, when said energizing current is due to the sum of said E. M. F.'s. It is not necessary to interpose a transformer between the source of the alternating E. M. F. and the rectifying circuit, but it will usually be convenient to do so.

The operation of the device is as follows: In case the first E. M. F. wave arising from the generator 1 is in say a negative direction and opposes the electromotive force of the battery 16, then the current in the magnet 6 will be due to the difference between the two E. M. F.'s and will not be of sufficient strength to draw the armature toward the magnet. The next E. M. F. wave will be in the positive and therefore in the same direction as the electromotive force of the battery 16 and the greater flow of current in the magnet 6 due to the sum of the two E. M. F's will be sufficient to attract the armature 10, thus initiating its vibration. It has already been pointed out that the time constant of the circuit containing the electromagnet is so chosen and the armature is so tuned that the phase of its vibration, when in full swing, lags substantially 180 degrees behind the alternating E. M. F. impressed on the magnet 6. For this reason the spring 9 will not begin to be attracted until the positive alternating E. M. F. begins to decline and will not short-circuit the magnet 6 in normal operation until the direction of the E. M. F.'s from the transformer (or the alternator) has been reversed becoming negative and thus of opposite direction to that of the battery. This short-circuiting of the magnet 6 during the alternating wave opposing the battery E. M. F. reduces the impedance of the circuit during that time and allows a charging current of sufficient amplitude to flow from the transformer into the battery along the circuit constituted by the terminal 4, the support 8, the spring 9, the contacts 14 and 13, the terminal 11, the battery 16, the terminal 17, the conductor 18 and the terminal 5. The time interval during which the electromagnet is to remain short-circuited can be adjusted by means of the movable contact 13. This adjustment should be such that the short-circuit around the magnet 6 will be open during the succeeding or positive E. M. F. wave when the current, irrespectively of its direction will again be reduced to the comparatively small value determined by the impedance of the magnet 6. This small current nevertheless magnetizes the electromagnet just as it did at the outset and eventually gives the spring mounted armature the impulse it requires in order to keep vibrating. It will be evident, therefore, that while the battery 16 receives the full strength of the current from the source of alternating E. M. F. in a direction to charge it, it can only send out a very small discharging current with the result that it will become fully charged just as if it were subjected to a unidirectional E. M. F. or current of suitable direction and strength.

In the foregoing description of the operation of this rectifier it has been assumed that the battery was so connected that its E. M. F. was in opposition to the negative half cycle of the alternating E. M. F. and it was shown that under these conditions the vibration of the spring mounted armature will be initiated during the positive half cycle and that said armature will short-circuit the electromagnet during at least part of the negative half cycle or at such time when the alternating E. M. F. opposes the battery E. M. F. If the connections of the battery to the terminals 11, 17 of the rectifier are reversed then the battery E. M. F. will oppose the positive half cycle of the alternating E. M. F., the vibration of the spring mounted armature will be initiated during the negative half cycle and the electromagnet will be short-circuited during the positive half cycle or again at such time when the alternating E. M. F. opposes the battery E. M. F.

It will therefore be evident that with my construction it is immaterial how the battery 16 is connected to the terminals 11 and 17 since a reversal of the battery terminals automatically displaces the time phase of the spring vibrations by 180 degrees, thus always causing the electromagnet to be short-circuited in normal operation, at a time when the alternating E. M. F. opposes the battery E. M. F.

Having fully described my invention, what I claim as new and desire to secure by Letters Patent of the United States is:

1. In an alternating current rectifier, the combination with a source of alternating E. M. F., of an electromagnet having an exciting coil in circuit with said source, an armature actuated by said electromagnet and adapted to establish a short circuit between the terminals of the exciting coil when said armature is in its attracted position, said armature having a natural frequency of vibration approximating the frequency of the alternating electromotive force impressed on the exciting coil of the electromagnet, but sufficiently different therefrom that the phase of the actual vibration of the armature resulting from the influence of the exciting flux of the magnet and the armature's natural frequency will be substantially in opposition to the phase of the resulting E. M. F. and a translating device connected in series with the exciting coil and the source of alternating E. M. F.

2. In an alternating current rectifier, the combination with a source of alternating E. M. F., of an electromagnet having an exciting coil in circuit with said source, an armature actuated by said electromagnet and adapted to establish a short circuit between the terminals of the exciting coil when said armature is in its attracted position, said armature having a natural frequency of vibration approximating the alternating electromotive force impressed on the exciting coil of the electromagnet, but sufficiently different therefrom that the phase of the actual vibration of the armature resulting from the influence of the exciting flux of the magnet and the armature's natural frequency will be substantially in opposition to the phase of the alternating E. M. F. and a source of unidirectional E. M. F. connected in series with the exciting coil and the source of alternating E. M. F.

3. In an alternating current rectifier, the combination with a source of alternating E. M. F., of an electromagnet having an exciting coil in circuit with said source, an armature actuated by said electromagnet and adapted to establish a short circuit between the terminals of the exciting coil when said armature is in its attracted position, said armature having a natural frequency of vibration approximating the alternating electromotive force impressed on said electromagnet, but sufficiently different therefrom that the phase of the actual vibration of the armature resulting from the influence of the exciting flux of the magnet and the armature's natural frequency will be substantially in opposition to the phase of the alternating E. M. F. and a storage battery connected in series with the exciting coil and the source of alternating E. M. F.

In testimony whereof, I have hereunto set my hand and affixed my seal in the presence of the two subscribing witnesses.

ERNST FÄSSLER. [L. S.]

Witnesses:
LEO SCHULER,
JEAN GRUND.